United States Patent [19]

Vijay et al.

[11] Patent Number: 4,840,215

[45] Date of Patent: Jun. 20, 1989

[54] TIRE CHANGER SAFETY POST

[75] Inventors: Tumkur R. Vijay; Bryce L. Mannen, both of Conway, Ark.

[73] Assignee: FMC Corporation, Chicago, Ill.

[21] Appl. No.: 224,204

[22] Filed: Jul. 22, 1988

Related U.S. Application Data

[63] Continuation of Ser. No. 10,029, Feb. 2, 1987, abandoned.

[51] Int. Cl.⁴ .................................................. B60L 25/00
[52] U.S. Cl. ................................ 157/1.0; 157/1.24; 157/20
[58] Field of Search ............... 157/1, 1.1, 1.17, 1.22, 157/1.24, 1.26, 1.28, 14–21; 141/38, 97; 206/304; 152/415

[56] References Cited

U.S. PATENT DOCUMENTS

| | | |
|---|---|---|
| 3,036,625 | 5/1962 | Penkoff et al. ............... 157/1.24 |
| 3,552,469 | 1/1971 | Corless ........................ 157/1.1 |
| 3,675,705 | 7/1972 | Corless ........................ 157/1.1 |
| 3,677,320 | 7/1972 | Corless ........................ 157/1.1 |
| 3,785,424 | 1/1974 | Rishovd ....................... 157/1.1 |
| 3,805,871 | 4/1974 | Corless ........................ 157/1.1 |
| 4,057,093 | 11/1977 | Joines ........................... 157/1 |
| 4,263,958 | 4/1981 | Corless ........................ 157/1.1 |
| 4,335,772 | 6/1982 | Bubick et al. ............... 157/1.28 |

FOREIGN PATENT DOCUMENTS

| | | | |
|---|---|---|---|
| 641717 | 8/1950 | United Kingdom ........... 157/14 |
| 1524514 | 9/1978 | United Kingdom ........... 157/1 |

OTHER PUBLICATIONS

Two page brochure CP/Coates Air-Flate Rim Clamp Tire Changer RC-10A.

Primary Examiner—Debra Meislin
Attorney, Agent, or Firm—H. M. Stanley; R. C. Kamp; R. B. Megley

[57] ABSTRACT

Safety apparatus for a tire changer having a support table for tire/rim assemblies and a tire inflation system includes a post having a quick disconnect mechanism for engagement with and release from the support table. The post has high pitch threads which receive a restraining cone with mating threads. The post is engaged with the table through a central rim opening and the restraining cone is moved on the threads to engage the edges of the rim opening. The post-table engagement actuates an air interlock which enables the tire inflation system. The cone is trapped on the post by structure on either end of the post.

14 Claims, 2 Drawing Sheets

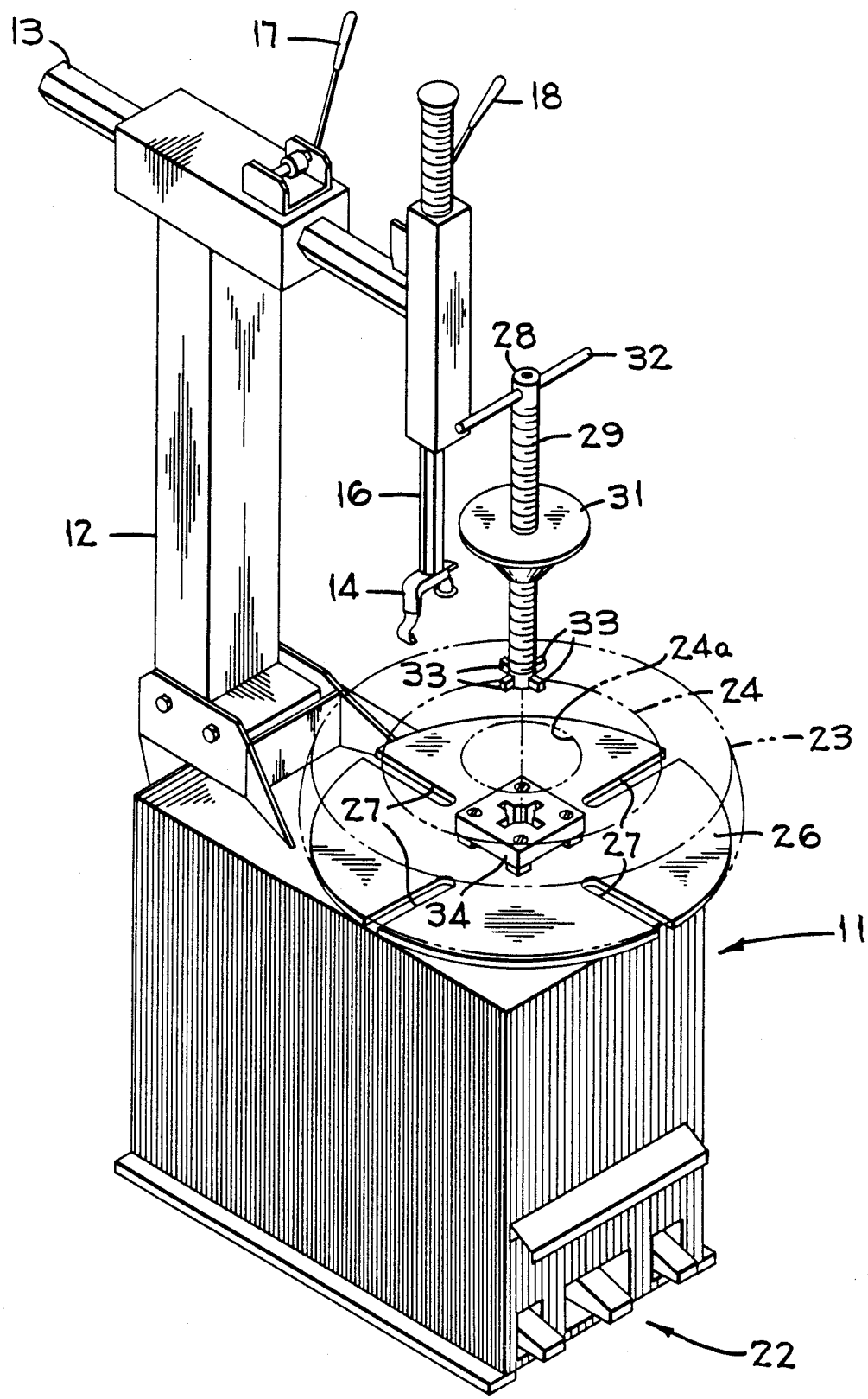
FIG_1

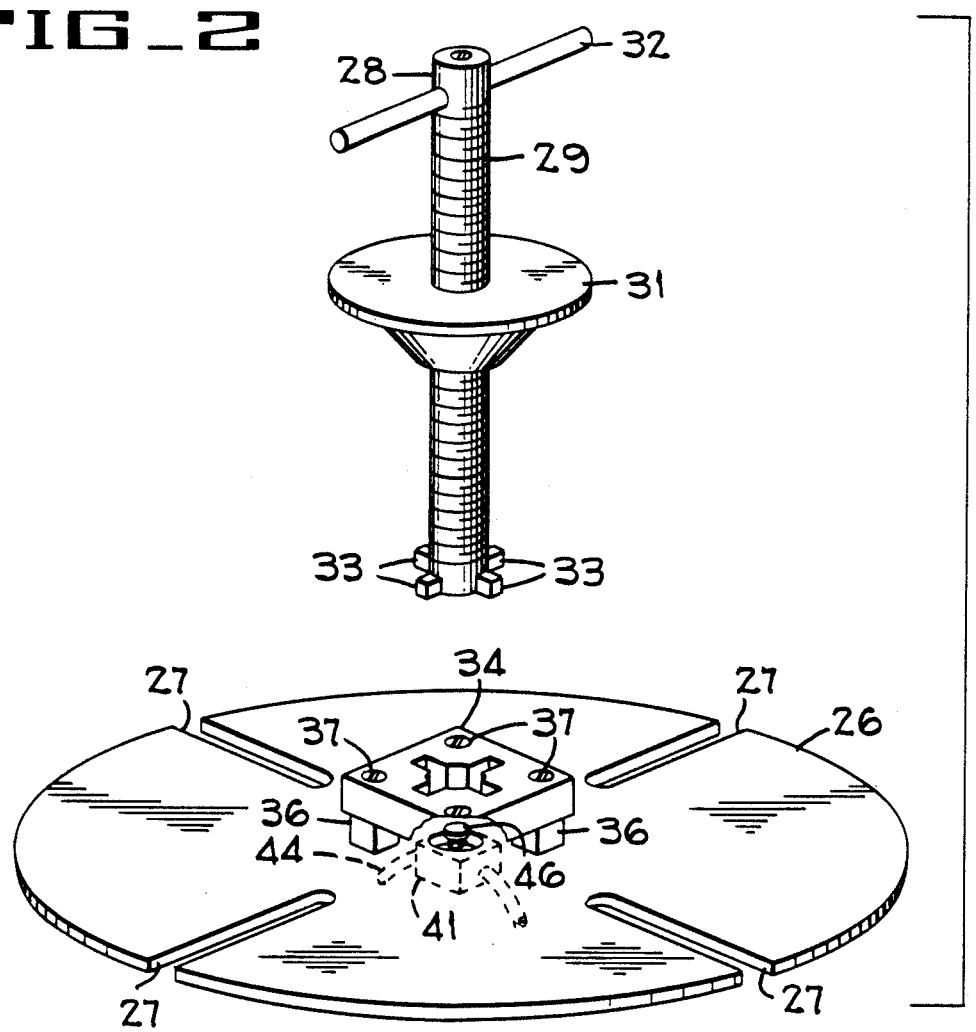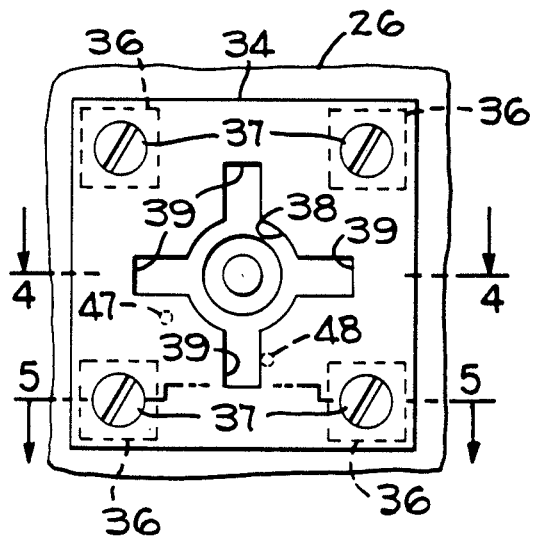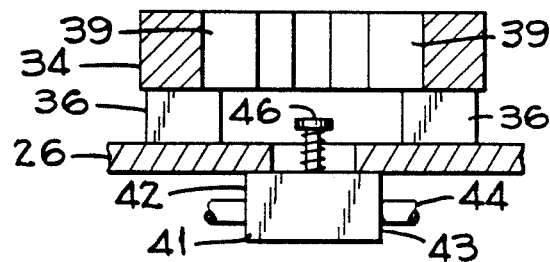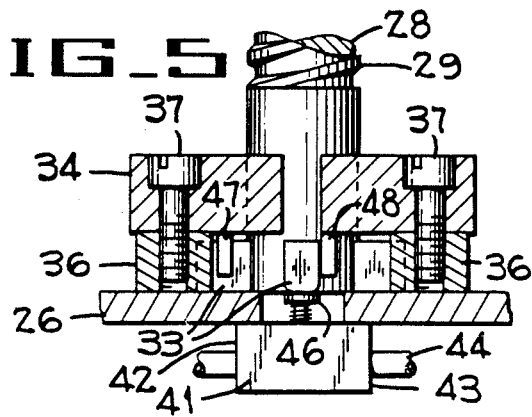

TIRE CHANGER SAFETY POST

This application is a continuation, of application Ser. No. 07/010,029, filed Feb. 2, 1987, now abandoned.

SUMMARY OF THE INVENTION

Safety apparatus for a tire changing machine which has a support table for receiving rim/tire assemblies and a tire inflation system, includes a rim restraint support post and restraint means coupled to the rim restraint support post for axial movement thereon. Also included is means for releasably connecting the rim restraint support post to the support table and means fixed to the support post for blocking removal of the restraint means from either the restraint end of support post.

In another aspect of the invention, safety apparatus for a tire changing machine having a support table for receiving rim/tire assemblies and a tire inflation system includes a rim restraint support post and restraint means coupled to the rim restraint support post prior to inflation for axial movement thereon. Also included is means for releasably connecting the rim restraint support post to the support table and pneumatic valve means urged from an inflation air disabling condition to an inflation air enabling condition by connection of the support post to the table.

Yet another aspect of the invention relates to safety apparatus for a tire changing machine having a support table for receiving rim/tire assemblies and a tire inflation system which includes rim restraint means and means for releasably connecting the rim, restraint means to the support table prior to tire inflation. Pneumatic valve means is included in the tire inflation system having inflation air enabling and disabling positions. The pneumatic valve means is urged to the enabling position by connecting the rim restraint means to the support table.

BRIEF DESCRIPTION OF THE DRAWINGS

FIG. 1 is a perspective view of a tire changer utilizing the present invention.

FIG. 2 is a perspective view showing the manner in which the safety apparatus of the present invention is engaged with the tire changer.

FIG. 3 is a fragmentary plan view showing the quick disconnect feature of the present invention.

FIG. 4 is a sectional view along the line 4—4 of FIG. 3.

FIG. 5 is a sectional view along the line 5—5 of FIG. 3 but with the restraint post in place.

DESCRIPTION OF THE PREFERRED EMBODIMENT

The invention disclosed herein will be described primarily in conjunction with a rotating table type tire changer for mounting and demounting tires onto and from vehicle wheel rims. The apparatus and method described herein is also useful on a tire changer having a stationary table for receiving the rim of a vehicle wheel. A tire changer of the first mentioned type is shown in FIG. 1 having a base shown generally at 11 with a tower 12 mounted at one end of the base. The tower is disposed to rock rearwardly away from the base as well as into a position where the tower is in a substantially vertical position as seen in FIG. 1. An arm 13 is disposed to slide through an upper portion of the tower 12 to dispose a tire mount-demount head 14 in a position overlying the junction of a vehicle wheel rim and a tire bead when the tower 12 is in the substantially vertical position. A vertical adjust arm 16 is adjustable to place the mount-demount head in proper position relative to the tire bead and the wheel rim to mount or demount the tire therefrom as desired. The horizontal and vertical adjust arms 13 and 16 are capable of being locked in position by means of manual locking mechanisms actuated by locking handles 17 and 18 respectively. Actuation of the locking handles spaces the mount-demount head 14 appropriately from the vehicle rim to avoid damage to the rim during operation as is well known in this art.

A group of foot pedals shown generally at 22 are disposed at the lower end of the base 11 opposite from the side of the base supporting the tower 12 for actuation by an operator to perform the functions carried out by the tire changer. One of the foot pedals 22 is utilized to actuate the tire inflator system included in the tire changer, but not disclosed in detail herein. The tire inflator may be substantially as disclosed in copending patent application U.S. Ser. No. 06/938,215 now U.S. Pat. No. 4,742,859 currently owned by the assignee herein. The inflation system may also include a bead seating device such as that included in U.S. Pat. No. 3,805,871.

A tire 23 is shown in phantom lines disposed on a rim 24 having a center opening 24a, also in phantom lines, lying on top of a rotating table 26 in the tire changer of FIG. 1. The table is rotated by means of an electrical motor and interconnecting gearing (not shown) which is known in this art and is supported within the base 11. The table in this type of tire changer has a number (in most cases 4) of radially moving jaws (not shown) which are disposed to move in grooves 27 shown formed in the table 26 to clamp either the inside or the outside of the rim 24 on the table. The jaws on the tire changer of FIG. 1 are caused to move radially in the grooves 27 by actuation of pneumatic cylinders (not shown) positioned between the table 26 and the upper surface of the base 11. A system of simple levers causes the jaws to undergo their aforedescribed radial movement. In this known manner the tire 23 and rim 24 assembly is firmly positioned on top of the table 26. However, in a tire changer where the wheel and rim assembly is captured to prevent radial motion on a tire changer table, motion of the tire and wheel assembly, or parts thereof, axially away from the table is not restrained to any appreciable degree. Moreover, it is often the case that the gripping function performed by the jaws is relaxed specifically for inflation of a tire on the table. Therefore, if a tire mounted on the table is over inflated to the point of explosion, the tire rim assembly will move violently upward off of the table 26 endangering any persons situated in the near vicinity.

The manner in which the violent movement of an exploding tire and rim assembly may be arrested in accordance with the invention disclosed herein involves structure for releasably connecting a rim restraint support post 28 to the tire-rim assembly support table 26. The support post has an array of high pitch threads 29 formed on the periphery thereof. Restraint structure such as the inverted truncated cone 31 is formed with an axial opening therethrough in which threads are formed which mate with the threads 29 on the support post. An upper located pin 32 is passed through and fixed in the upper end of the post serving both as a handle for rotating the post to lock it in place with the support table 26, to be hereinafter described, and to serve as a stop to prevent the cone 31 from being removed from the top of the post 28.

At the lower end of the post an array of four blocks 33 extends from the periphery thereof. The array of blocks 33 appears to form a cross-like structure at the bottom of the post 28 (FIGS. 1 and 2) which serves to prevent the cone 31 from being turned off of the post at the bottom thereof. The cone may therefore seen to be trapped on the post.

A lock plate 34 is mounted on four standoffs 36 by means of screws 37 passing therethrough and into the upper surface of the support table 26. The lock plate has a bottom surface in spaced relation with the upper surface of the table. The lock plate has a central opening therethrough having a circular center portion 38 and extensions 39 beyond the circular center opening having an overall cruciform shape as best seen in FIG. 3 of the drawings. The cruciform opening formed by the combination of the circular opening and the extensions thereof is shaped to accept the bottom portion of the post 28 having the array of extending blocks 33. Therefore, the support post 28 may be lowered through the lock plate 34 and quickly connected or disconnected therewith as hereinafter described.

FIG. 4 shows a pneumatic valve 41 having an input side 42 and an output side 43 for a tire inflation hose 44. The pneumatic valve is a normally closed device blocking passage of tire inflation air through the tire inflation hose in its normal condition. A spring loaded plunger 46 is located in the top of the valve 41 which, when depressed, opens the valve to enable air flow through the tire inflation hose 44. The valve 41 is attached by some convenient means to the under surface of the support table 26 and the plunger 46 extends upwardly through a centrally located hole in the support table, being accessible from the upper side of the table as seen in FIG. 4.

When the support post 28 is lowered through the cruciform opening 38/39 in the lock plate 34, the bottom of the post depresses the plunger 46 opening the pneumatic valve 41 thereby enabling the tire inflation air path. The support post is then rotated by means of the handle 32 through approximately 45° in a clockwise direction as seen in FIG. 3. One of the blocks 33 is stopped at approximately the 45° rotational position by a stop pin 47 for the locked or engaged position of the support post with the support table 26. The support post 28 is therefore locked in an engaged position with the support table and the cone 31 may be adjusted axially along the support post by turning it on the threads 29. In this fashion, when a tire/rim assembly 23/24 is mounted on the support table, the support post may be inserted through the central opening 24a in the rim 24 and locked in position on the support table as hereinbefore described. The cone 31 may be adjusted axially to contact the edges of the opening 24a so that the tire/rim assembly is firmly fixed in axial position with the support table. Consequently, the tire may be inflated, in conjunction with the aforementioned bead seater of U.S. Pat. No. 3,805,871, by coupling an air chuck on the end of the tire inflation hose 44 to the tire inflation valve since the passage of tire inflation air through the hose has been enabled by opening valve 41 with the insertion of support post 28 into the lock plate 34.

When the inflation of the tire 23 on the rim 24 is completed, the support post may be rotated in a counterclockwise direction as seen in FIG. 3 until one of the array of blocks 33 on the end of the support post comes into contact with an unlock stop pin 48 extending from the bottom of the lock plate 34 (FIGS. 3 and 5). The cruciform array of blocks 33 is now aligned with the similarly shaped opening formed by the extensions 39, and the support post 28 may be withdrawn and removed from the support table 26. The inflated tire/rim assembly is thereafter removed from the support table. It may be seen that during the inflation process, explosion of the tire from the rim due to overinflation or a faulty tire bead will be absorbed by the cone 31 and the support post 28, thereby preventing injury from the explosion to personnel in the vicinity. Inflation of the tire on the support table is not possible until the rim restraint for axial movement is in place and the tire inflation air path is thereby enabled by opening valve 41.

Although the best mode contemplated for carrying out the present invention has been herein shown and described, it will be apparent that modification and variation may be made without departing from what may be regarded to be the subject matter of the invention.

What is claimed is:

1. Safety apparatus for a tire changing machine comprising a support table for receiving rim/tire assemblies, a tire inflation system attached to the tire changing machine, a rim restraint support post having an upper and a lower end, restraint means coupled to said rim restraint support most for axial movement thereon and for firmly fixing the rim/tire assembly axially with respect to the support table, means for releasably connecting said rim restraint support post to the support table preparatory to tire inflation, means fixed to said support post for blocking removal of said restraint means from each end of said restraint support post, pneumatic valve means attached to said tire inflation system and having inflation air enabling and disabling positions, said support post having means to contact and urge said pneumatic valve means to said enabling position when said rim restraint support post is connected to the support table.

2. Safety apparatus as in claim 1 comprising means for positioning said restraint means in a plurality of axial positions between said upper and lower ends on said rim restraint support post.

3. Safety apparatus as in claim 1 wherein said means for releasably connecting comprises a standoff plate mounted centrally on the support table, said standoff plate having a shaped aperture therethrough, unitary means formed at said lower end of said rim restraint support post configured for passage through said shaped aperture in one rotational position and for subsequent engagement with the underside of said standoff plate in another rotational position.

4. Safety apparatus for a tire changing machine comprising a support table for receiving rim/tire assemblies, a tire inflation system attached to said tire changing machine, a rim restraint support post, restraint means coupled to said rim restraint support post for axial movement thereon and for firmly fixing the rim/tire assembly axially with respect to the support table, means for releasably connecting said rim restraint support post to the support table prior to tire inflation, and interlock means for enabling and disabling said tire inflation system, said support post having means to contact and urge said interlock means from an inflation air disabling condition to an inflation air enabling condition when said support post is connected to the table.

5. Safety apparatus as in claim 4 comprising means for stopping removal of said restraint means from said support post.

6. Safety apparatus as in claim 4 comprising means for positioning said restraint means in a plurality of axial positions on said rim restraint support post.

7. Safety apparatus as in claim 4 wherein said means for releasably connecting comprises a standoff plate mounted centrally on the support table, said standoff plate having a shaped aperture therethrough, means formed at one end of said rim restraint support post configured for passage through said shaped aperture in one rotational position and for subsequent engagement with the underside of said standoff plate in another rotational position.

8. Safety apparatus as in claim 4 wherein said interlock means comprises a pneumatic valve.

9. Safety apparatus for a tire changing machine comprising a support table for receiving rim/tire assemblies and a tire inflation system connected to said tire changing machine, rim restraint means for firmly fixing the rim/tire assembly axially with respect to the support table, means for releasably connecting said rim restraint means to the support table prior to tire inflation, and pneumatic valve means attached to said tire inflation system having inflation air enabling and disabling positions, said rim restraint means having means to contact and urge said pneumatic valve means to said enabling position by connecting said rim restraint means to the support table.

10. Safety apparatus as in claim 9 wherein said rim restraint means comprises a restraint support post, and restraining means mounted on said restraint support post.

11. Safety apparatus as in claim 10 wherein said restraining means is movable axially on said restraint support post, including means for blocking removal of said restraining means therefrom.

12. Safety apparatus as in claim 9 wherein said rim restraint means comprises a threaded shaft and an impact absorbing member having a threaded hole therethrough adapted to engage said threaded shaft.

13. Safety apparatus as in claim 12 wherein said impact absorbing member comprises a truncated cone and said threaded hole is axially located therein.

14. Safety apparatus as in claim 12 comprising means for preventing removal of said impact absorbing member from said threaded shaft.

* * * * *